May 26, 1970 MASATO SUGAHARA 3,513,796
METHOD OF MECHANICALLY FORMING STITCHES RESEMBLING
MANUALLY FORMED STITCHES IN APPEARANCE
Filed Dec. 27, 1968 4 Sheets-Sheet 1
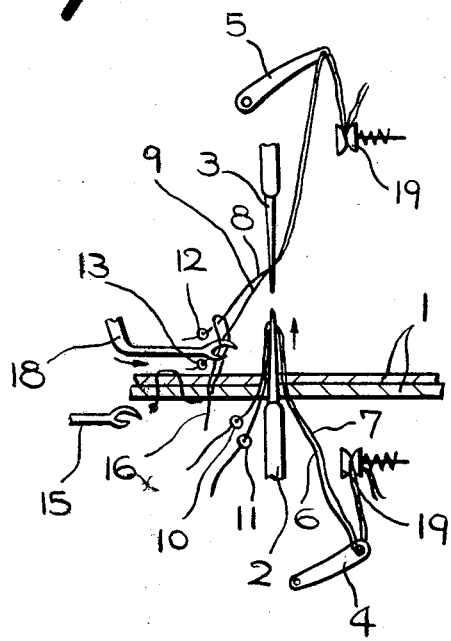
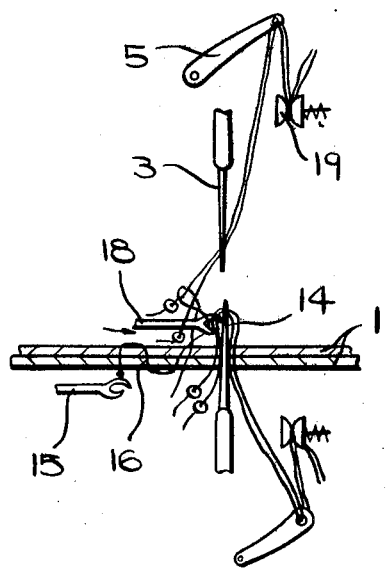
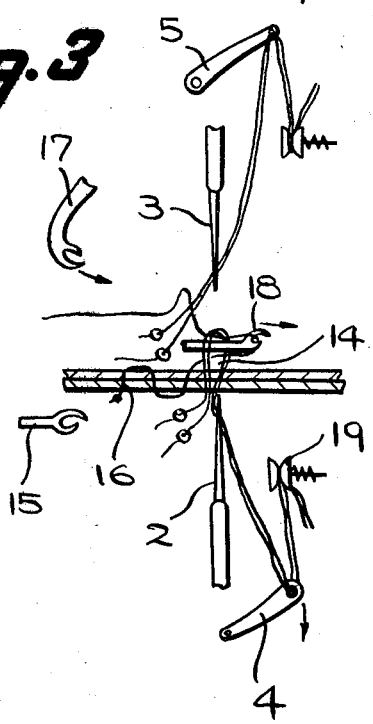
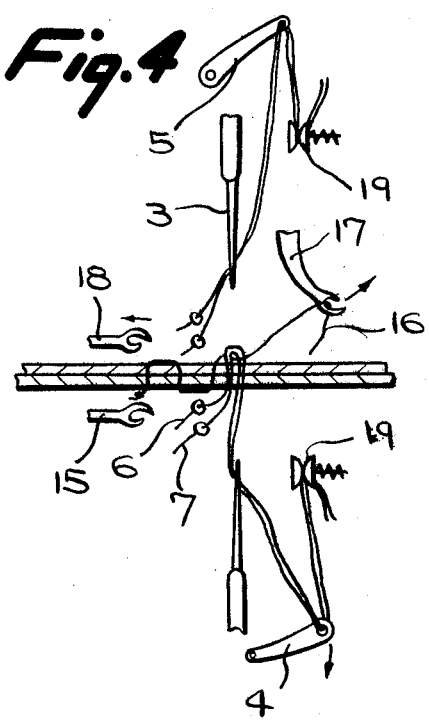
INVENTOR
MASATO SUGAHARA
BY Stevens, Davis, Miller & Mosher
ATTORNEYS

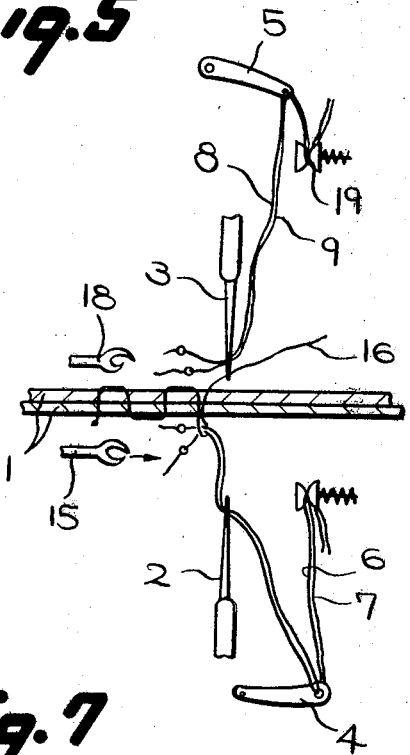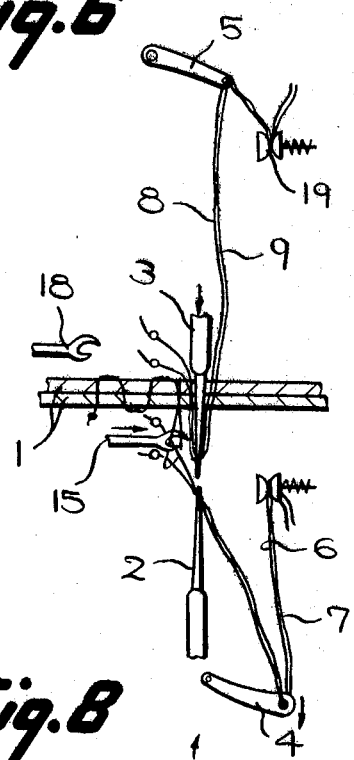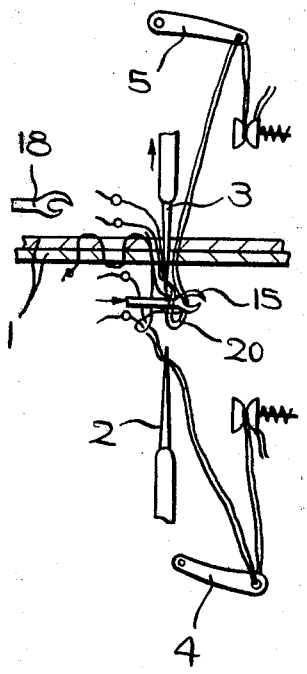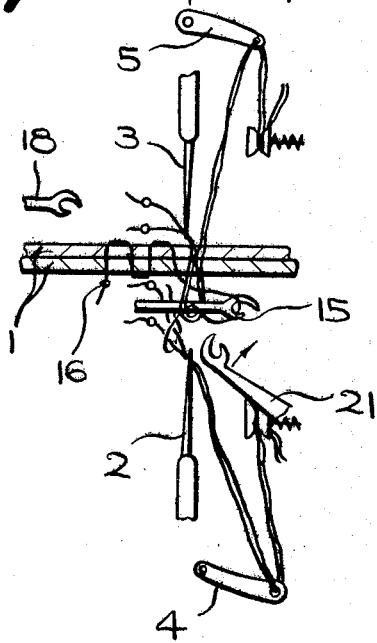

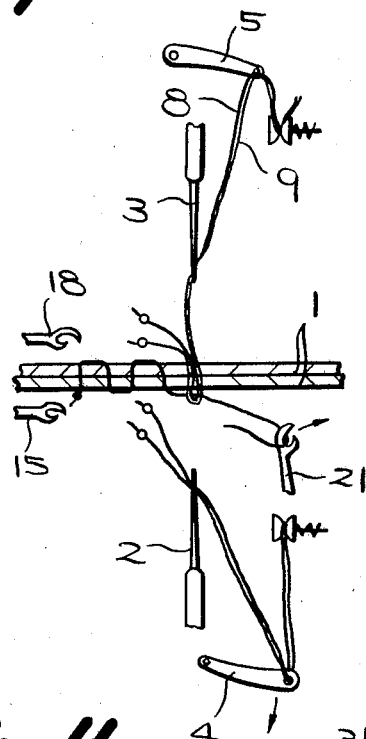
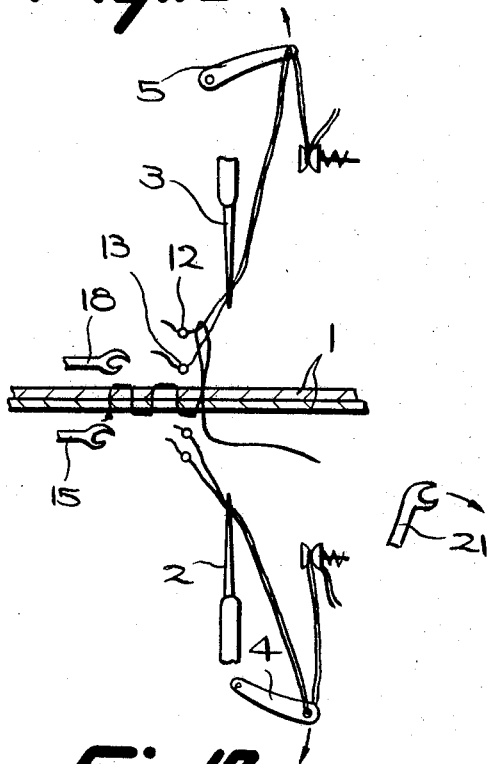
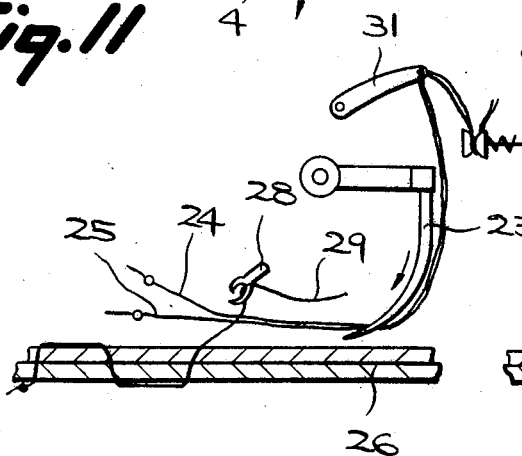
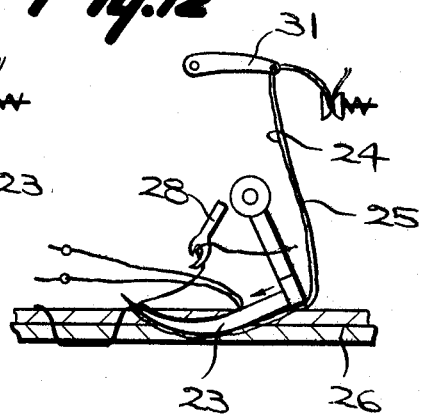

United States Patent Office 3,513,796
Patented May 26, 1970

3,513,796
METHOD OF MECHANICALLY FORMING STITCHES RESEMBLING MANUALLY FORMED STITCHES IN APPEARANCE
Masato Sugahara, Tokyo, Japan, assignor to Sugawara Sewing Machine Co., Ltd., Tokyo, Japan
Filed Dec. 27, 1968, Ser. No. 787,326
Claims priority, application Japan, Dec. 30, 1967, 43/84,756
Int. Cl. D05b 1/02
U.S. Cl. 112—262                         3 Claims

ABSTRACT OF THE DISCLOSURE

A method of mechanically forming stitches comprising the steps of inserting two operation threads into a hole formed in a sewing needle, extending said sewing needle through cloths or other materials to be sewed, withdrawing said sewing needle from said cloths or other materials to be sewed while leaving a loop of said operation threads, inserting a sewing thread by loopers into said loop, and causing said sewing thread to extend through said cloths or other materials to be sewed by pulling said operation threads out of said cloths or other materials to be sewed.

The present invention relates to methods of forming stitches in general, and in particular the invention deals with a method of mechanically forming stitches which resemble manually formed stitches in appearance.

Conventional sewing machines of the hand sewing type is constructed such that in forming stitches of a sewing thread on cloths or other materials to be sewed, the sewing thread is advanced by moving a sewing needle between an upper needle stick and a lower needle stick so that the sewing thread may pass through the cloths to be sewed and form stitches thereon. Conventional sewing machines provide no means whereby sewing can be mechanically effected in the same manner as hand sewing by using a fixed needle. For this reason, conventional sewing machines of the hand sewing type are complicated in construction and high in cost. Moreover, sewing machines of the hand sewing type of the prior art do not lend themselves to scoop sewing.

Accordingly, the present invention has as its object the provision of a method of mechanically forming stitches which resemble manually formed stitches formed in appearance by using a fixed needle or needles, such method being carried into practice by using a sewing machine of simple construction.

Figure 13:
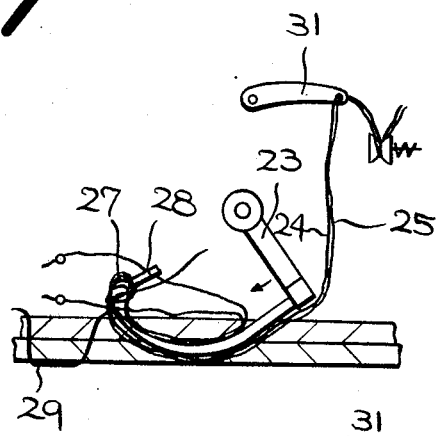
Figure 14:
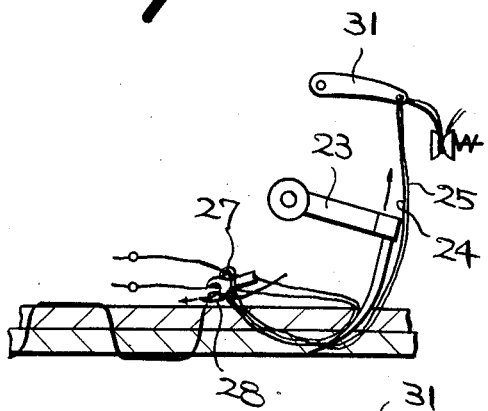
Figure 15:
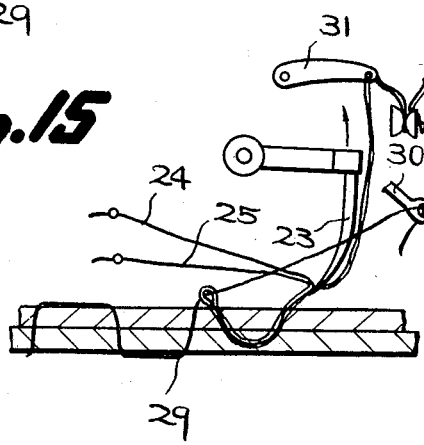
Figure 16:
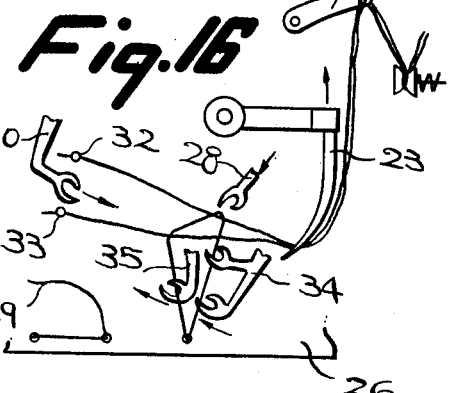
Figure 17:
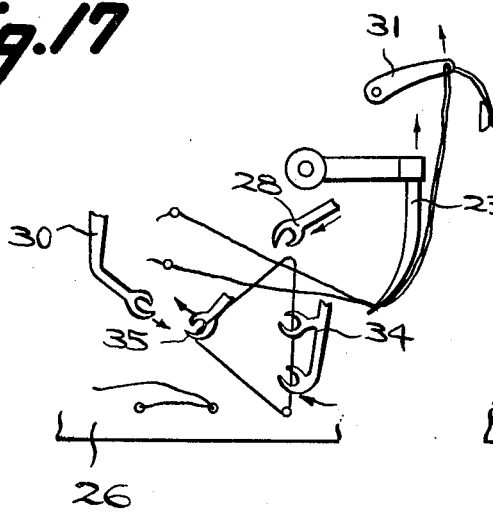
Figure 18:
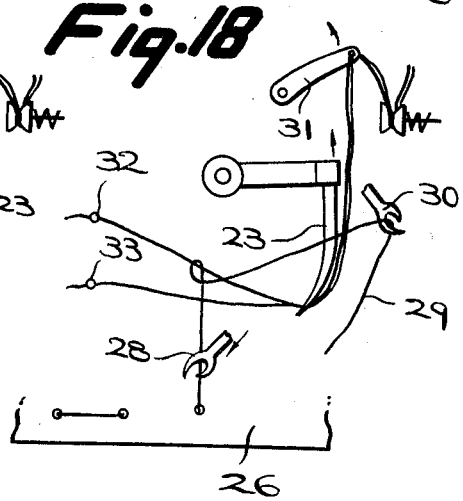

Additional objects and advantages of the invention will become apparent from consideration of the description set forth hereunder when considered in conjunction with the accompanying drawings, in which:

FIG. 1 schematically shows a lower needle extending through cloths or other materials to be sewed;

FIG. 2 schematically shows the lower needle being slightly retracted from the position shown in FIG. 1;

FIG. 3 schematically shows one upper looper being inserted into a loop of the upper operation threads;

FIG. 4 schematically shows a sewing thread being fully inserted into the loop of upper operation threads;

FIG. 5 schematically shows the manner in which the two upper operation threads are pulled downwardly;

FIG. 6 schematically shows an upper needle extending through the cloths;

FIG. 7 schematically shows the upper needle being slightly retracted from the position shown in FIG. 6;

FIG. 8 schematically shows the manner in which one lower looper is inserted in a loop of lower operation threads;

FIG. 9 schematically shows the sewing thread being fully inserted into the loop of lower operation threads;

FIG. 10 schematically shows the manner in which the lower operation threads are pulled upwardly;

FIG. 11 schematically shows the manner in which the operation of a scoop sewing needle in another embodiment of the invention is being initiated;

FIG. 12 schematically shows the manner in which the scoop sewing needle is inserted into cloths;

FIG. 13 schematically shows the scoop sewing needle being slightly retracted from the position of FIG. 12 while a loop of two operation threads is formed;

FIG. 14 schematically shows a sewing thread being inserted by a looper into the loop of operation threads;

FIG. 15 schematically shows the sewing thread being fully inserted into the loop of operation threads;

FIG. 16 schematically shows the sewing thread being pulled out by the two operation threads;

FIG. 17 schematically shows the manner in which the sewing thread is moved forwardly by other two loopers; and FIG. 18 schematically shows the sewing thread being ready to be inserted by the looper into another loop of the operation threads.

One embodiment of the method of mechanically forming stitches resembling manually formed stitches in appearance will now be explained. A sewing needle 2 is disposed below cloths or other materials to be sewed, and a sewing needle 3 is disposed above said cloths for alternate up and down motion. Two operation threads 6 and 7 unwound from a bobbin are fed through a lever 4 to be inserted into a hole formed in the lower needle 2, while two operation threads 8 and 9 unwound from a bobbin are fed through a lever 5 to be inserted into a hole formed in the upper needle 3. Said two operation threads 6 and 7 mount near their ends slip prevention members 10 and 11 respectively, while said two operation threads 8 and 9 also mount near their ends similar slip prevention members 12 and 13 respectively. In operation, the lower sewing needle 2 is first moved upwardly to extend through the cloths 1 with the operation threads 6 and 7 being connected to the needle 2, and then retracted slightly as shown in FIG. 2 so that a portion of the operation threads 6 and 7 left above the surface of the cloths 1 forms a loop 14. As soon as the loop 14 is formed, a suitable length of sewing thread 16 is caught by one upper looper 18 and inserted thereby into the loop 14 as shown in FIG. 3. Then, the other upper looper 17 catches the forward end of said length of sewing thread 16 and pulls same, and said one upper looper 18 is retracted as shown in FIG. 4, with a result that the length of sewing thread 16 is fully inserted into the loop 14 of the two operation threads and the cloths 1 are moved forwardly a predetermined distance. In a moment, the lever 4 is pivoted downwardly, so that the two operation threads 6 and 7 pull the length of sewing thread 16 downwardly to pass through the cloths 1 as shown in FIG. 5. At the same time, the leading ends of the operation threads 6 and 7 are separated from each other by the slip prevention members 10 and 11 and formed into a Y-shape as shown in FIG. 6, resulting in the length of sewing thread 16 being pulled through the cloths 1 to extend below same and forming a loop. This facilitates one lower loop 15 catching said length of sewing thread 16. Then, the upper sewing needle 3 with the two operation threads 8 and 9 connected thereto is moved downwardly to extend through the cloths 1 at a position spaced apart from the preceding stitch. When the upper sewing needle 2 is slightly retracted, the two operation threads 8 and 9 form a loop 20 below the underside of the cloths as shown in FIG. 7.

The previously described length of sewing thread 16 caught by said one lower looper 15 is inserted into said loop 20 as said one lower looper is moved forwardly. As soon as the one looper 15 reaches its foremost position, it is beginning to move rearwardly and the length of sewing thread 16 is caught and pulled by the other lower looper 21 so that it fully extends through the loop 20 as shown in FIG. 9. Then, the cloths are advanced a predetermined distance and the two operation threads 8 and 9 as well as the length of sewing thread 16 are pulled upwardly through the cloths 1 to extend above the cloths by the pivotal motion of upper lever 5 as shown in FIG. 10. The leading ends of the operation threads 8 and 9 are separated from each other by the slip prevention members 12 and 13 and formed into a Y-shape, with a result that the length of sewing thread 16 pulled upwardly to extend above the cloths 1 is formed into a loop. The loop of sewing thread 16 is caught by said one upper looper 18 which is moved forwardly again in preparation for the next following sewing operation to be initiated by the upwardly moving lower needle 2. This cycle of operation is repeated again and again to provide stitches as desired.

From the foregoing description, it will be appreciated that the present invention employs two operation threads inserted in a hole formed in an upper sewing needle and two operation threads inserted in a hole formed in a lower sewing needle as means for causing a sewing thread to extend through cloths or other materials to be sewed. The invention has succeeded in providing mechanically formed stitches resembling manually formed stitches in appearance by using fixed needles which have hitherto been impossible to provide by conventional sewing machines of the hand sewing type using movable needles.

Another embodiment of the invention as applied to a scoop sewing machine will now be explained. In this embodiment, two operation threads 24 and 25 are inserted in a hole formed in a scoop sewing needle 23 as shown in FIG. 11 and the scoop sewing needle 23 is moved through cloths and other materials in a scoop sewing motion to be sewed 26 as shown in FIG. 12. When the needle 23 is slightly retracted, a loop 27 formed by a length of the operation threads 27 and 28 is left above the surface of the cloths 26 as shown in FIG. 13. Simultaneously, a length of sewing thread 29 is caught by one looper 28 and inserted thereby into said loop 27 as shown in FIG. 14, and said length of sewing thread 29 is caught and pulled by another looper 30 as shown in FIG. 15. The looper 28 is retracted, and the cloths 26 are advanced a predetermined distance, with the length of thread 29 being fully inserted into the loop 27. In a moment, a lever 31 is pivotally moved upwardly and the two operation threads 24 and 25 pull the length of sewing thread 29 to cause same to extend through the cloths 26 in a scooping motion. The leading ends of the operation threads 24 and 25 are separated from each other and formed into a Y-shape by slip prevention members 32 and 33 mounted near their ends respectively. This results in the length of sewing thread 29 forming a loop, and the loop of sewing thread 29 is caught by two loopers 34 and 35. In their forward movements, the looper 34 conveys one portion of the loop of sewing thread 29 to a position at which the looper 28 is disposed and the looper 35 conveys another portion of the loop of sewing thread 29 to a position at which the looper 30 is disposed as shown in FIG. 17. The loop 30 immediately catches said portion of the loop of sewing thread 29 and pulls out the leading end of the sewing thread 29 as shown in FIG. 18. Then, the cloths 26 are advanced a predetermined distance and the scoop sewing needle 23 is moved in a scoop sewing motion through the cloths 26. The length of sewing thread 29 is inserted by the looper 28 into the loop 27 formed by the operation threads 24 and 25, and the looper 30 catches the length of sewing thread 29 while the looper is being retracted. This cycle of operation is repeated again and again to effect scoop sewing of the cloths in the hand sewing style.

From the foregoing description, it will be appreciated that the present invention also permits to mechanically form stitches resembling manually formed stitches in appearance by employing two operation threads inserted in a hole formed in a scoop sewing needle as means for effecting scoop sewing of cloths or other materials. The invention is very useful in mechanically providing stitches resembling manually formed stitches which have hitherto been impossible to form mechanically.

What I claim is:

1. A method of mechanically forming stitches comprising the steps of inserting two operation threads into a hole formed in a sewing needle, extending said sewing needle through cloths or other materials to be sewed, withdrawing said sewing needle from said cloths or other materials to be sewed while leaving a loop of said operation threads, inserting a sewing thread by loopers into said loop, and causing said sewing thread to extend through said cloths or other materials to be sewed by pulling said operation threads out of said cloths or other materials to be sewed, inserting two operating threads through the cloths or other material to be sewed at a point spaced from the first operation and repeating the steps to form stitches.

2. A method as defined in claim 1 in which said sewing needle and said loopers are positioned both above and below said cloths or other materials to be sewed.

3. A method as defined in claim 1 or claim 2 in which slip prevention members are mounted near the leading ends of said two operation threads so as to facilitate separating the forward end portions of the operation threads into a Y-shape.

References Cited

UNITED STATES PATENTS

| 2,604,863 | 7/1952 | Pedersen | 112—262 X |
| 3,207,107 | 9/1965 | Ferré | 112—154 X |

ALFRED R. GUEST, Primary Examiner

U.S. Cl. X.R.

112—267